United States Patent [19]
Onodera

[11] Patent Number: 5,607,783
[45] Date of Patent: Mar. 4, 1997

[54] MAGNETIC RECORDING MEDIUM AND METHOD FOR FABRICATING THE SAME

[75] Inventor: Katsumi Onodera, Kanagawa, Japan

[73] Assignee: Fuji Electric Co., Ltd., Japan

[21] Appl. No.: 255,879

[22] Filed: Jun. 8, 1994

[30] Foreign Application Priority Data

Jun. 8, 1993 [JP] Japan ................................. 5-136294

[51] Int. Cl.$^6$ ........................................ G11B 5/66
[52] U.S. Cl. ........................ 428/694 T; 428/694 TP; 428/694 TC; 428/408; 428/900; 204/192.2
[58] Field of Search ........................ 428/694 T, 694 TP, 428/694 TC, 900, 408; 204/192.2

[56] References Cited

U.S. PATENT DOCUMENTS

| | | | |
|---|---|---|---|
| 5,227,211 | 7/1993 | Eltoukhy | 428/65.4 |
| 5,266,409 | 11/1993 | Schmidt | 428/446 |
| 5,364,690 | 11/1994 | Takahashi | 428/212 |
| 5,397,644 | 3/1995 | Yamashita | 428/408 |

FOREIGN PATENT DOCUMENTS

| | | |
|---|---|---|
| 61-126627 | 6/1986 | Japan . |
| 1-138610 | 5/1989 | Japan . |
| 1-258220 | 10/1989 | Japan . |
| 2-29919 | 1/1990 | Japan . |
| 2-71422 | 3/1990 | Japan . |
| 2-87322 | 3/1990 | Japan . |
| 2-161612 | 6/1990 | Japan . |
| 2-282470 | 11/1990 | Japan . |
| 3-245321 | 10/1991 | Japan . |

*Primary Examiner*—Leszek Kiliman
*Attorney, Agent, or Firm*—Rossi & Associates

[57] ABSTRACT

A magnetic recording medium which includes a non-magnetic base plate, a magnetic layer disposed on the base plate, and a carbon protective layer containing hydrogen disposed on the magnetic layer. The protective film may include a plurality of layers, including a first layer having a hydrogen content lower than a hydrogen content in a second layer disposed on the first layer. Alternatively, the carbon protective film may have a hydrogen content which gradually continuously increases from a bottom surface thereof to a top surface thereof. A method is also disclosed in which a non-magnetic base plate having a magnetic layer formed thereon is sputtered in a sputtering chamber having two spaced apart gas feed pipes connected thereto, wherein the base plate is moved from the first gas feed pipe to the second gas feed pipe, and the second gas feed pipe feeds a sputtering gas at a higher flow rate than the first gas feed pipe.

5 Claims, 11 Drawing Sheets

MAGNETIC RECORDING MEDIUM AND METHOD FOR FABRICATING THE SAME

BACKGROUND OF THE INVENTION

This invention relates to a magnetic recording medium and a method for fabricating the magnetic recording medium used in hard disc drives or the like, and more particularly, relates to a carbon protective film containing hydrogen of the magnetic recording medium and a method for fabrication the carbon protective film.

Hard disc drives or the like are frequently employed as an external storage device for a data processing apparatus such as a computer or the like. In hard disc drives, since a contact start stop method (herein after referred to as CSS) is employed in which a read/write head floats above a recording medium of a magnetic disc while the disc is rotating and the head touches the recording medium while the disc is not rotating, the read/write head is brought to contact to slide on a recording medium when the disc starts or stops rotating. When wear resistance and lubricative properties of a protective film coating a surface of the recording medium is insufficient, abrasion of the protective film proceeds as the aforementioned start-stop cycle is repeated, and in the worst case, a magnetic layer is damaged to cause the head to crash into the disc.

FIG. 10 is a partial sectional perspective view showing a structure of the conventional magnetic recording medium used in hard disc drives. In this magnetic recording medium, a non-magnetic base plate 1 comprises a non-magnetic substrate 1a, and a non-magnetic metal layer (hardening layer) 1b laminated on the substrate 1a. A non-magnetic metal under layer 2 is laminated on the base plate 1. A thin film magnetic layer 3 is formed on the underlayer 2 by laminating a ferromagnetic Co-Cr-Ta (cobalt-chromium-tantalum) alloy layer or a ferromagnetic Co-Cr-Pt(cobalt-chromium-platinum) alloy layer. A protective film 4 is formed on the magnetic layer 3. The magnetic disc is, if necessary, formed by coating a lubricative layer 5 which comprises liquid lubricant on the protective film 4. As an example of the base plate 1, a base plate which comprises Ni-P plated layer 1b formed by electroless plating on a non-magnetic Al-Mg alloy substrate 1a is employed. An alumilite base plate, a glass base plate, a ceramic base plate and the like are also employed. The base plate 1 is polished, if necessary, and is provided with a surface properly roughened by texture formation (texture processed surface). The non-magnetic metal underlayer 2 that comprises Cr; magnetic layer 3 made Co-Cr-Ta alloy as an example; and an amorphous carbon protective film 4 are successively deposited on the base plate 1 by the sputtering method under Ar atmosphere on the base plate 1 heated up to 200° C. Fabrication of the metal thin film disc is completed by coating on the protective film 4 the lubricative layer 5 which comprises a liquid lubricant of the fluorocarbon family.

In the metal thin film recording medium fabricated by the sputtering method, an amorphous carbon film is usually employed as the protective film 4 formed on the magnetic layer 3 by sputtering from a carbon target. Additionally, oxides (e.g., zirconia) are sometimes employed in the protective film 4. Carbon is employed in the protective film 4 because the amorphous carbon layer formed by the sputtering method shows relatively strong graphite-like properties, and shows low coefficient of friction, as graphite specifically does, under the atmosphere containing moisture.

This amorphous carbon protective film shows enough wear resistance and excellent CSS resistance when used with the conventional read/write head of Zn-Mn ferrite with a Vickers hardness of about 650. However, the hardness of the amorphous carbon is much smaller than those of hard ceramic head materials like $Al_2O_3.TiC$ or $CaTiO_3$ (Vickers hardness of about 2000) which have been employed recently in a thin film head of the hard disc drives or in a slider of the metal-in-gap (MIG) heads. So, the amorphous carbon protective film tends to be worn out when used with those hard sliders and to crash into the sliders in the worst case because of its insufficient wear resistance and poor CSS resistance with respect to those hard sliders. If a hard protective film made of oxides is employed, the oxide protective film may hardly be worn out, but the oxide protective film may be too hard and its coefficient of friction may be too high; the read/write head crashes instantaneously by head touch in an instantaneous high energy state into foreign substances or projections on the disc surface while the read/write head is being floated during its seek operation or CSS operation.

For solving these problems, it has been disclosed to form on the magnetic layer a protective film comprising a diamond-like carbon film which contains more diamond bonds than graphite bonds by growing diamond-like properties in the carbon film. Various proposals have been made so far on the diamond-like carbon film that shows a high hardness inherent of its diamond structure as well as an excellent sliding property inherent to carbon, and improves wear resistance when used with the hard slider made of $Al_2P_3$. TiC or $CaTiO_3$. Japanese Patent laid open S61-126627 discloses a composite film comprising a hard carbon layer and a fluorine containing lubricative layer formed by the sputtering method or by the CVD method under an atmosphere of gas mixture of an inert gas and a hydrocarbon gas. Japanese Patent laid open H02-71422 discloses a carbon film, film properties of which are identified by hydrogen bond in the film and by its Raman spectrum. Japanese Patent laid open H02-299199 discloses a carbon film, film properties of which are identified by a Raman spectrum. Japanese Patent laid open H02-87322 discloses an example of a magnetic recording medium which comprises a hydrogenated carbon film and a lubricant coated on the carbon film. Japanese Patent laid open H01-258220 discloses a diamond-like carbon protective film containing from 2 to $7\times10^{23}$ atoms/cc of hydrogen, which shows similar hardness with the hard slider and an excellent CSS resistance. Additionally, Japanese Patent laid open H02-282470 discloses a carbon protective film formed by sputtering in a hydrocarbon gas, which shows a similar hardness with the conventional graphite protective film grown by sputtering in an Ar gas, and is identified to show hydrophobic properties on its surface.

Though we reexamined these disclosed protective films, we failed to reproduce any satisfactory sliding property for the hard slider made of $Al_2O_3.TiC$ or $CaTiO_3$. In the carbon protective films described above, wear resistance is improved by forming a hard layer which contains high rate of diamond bonds by growing diamond-like properties in the layer. However, when the protective film is too hard, it damages the magnetic head and the abraded particles enhance abrasion of the magnetic head itself and the magnetic disc. On the other hand, when the protective film is too soft, the protective film is worn out by the hard slider as in the case of the conventional amorphous carbon protective film. As has been explained so far, according to the prior art, any protective film has not been realized that shows an excellent sliding property including a low coefficient of friction and high wear resistance, and an optimum CSS resistance.

In relation to an application of a carbon protective film to the sliders made of $Al_2O_3.TiC$ or $CaTiO_3$ while maintaining the low coefficient of friction of graphite-like carbon, U.S. patent application No. 08/142,862 (hereinafter referred to as the "Related Application") describes a carbon protective film with enriched hydrogen content, among the properties of which obtained by the sputtering method hard diamond-like properties are grown on one hand and its hardness is lowered to increase toughness by introducing polymer-like bonds on the other hand. It is described in the Related Application that an excellent CSS resistance against the magnetic head made of hard slider material is obtained by a carbon protective film. The Raman spectroscopic analysis conducted on carbon, a main constituent of the carbon protective film, by the excitation by a 514.5 nm argon ion laser beam reveals that the carbon protective film contains polymer-like bonds and diamond bonds with more content than the coexisting graphite bonds.

FIG. 11 is a graph, described in the related Application, showing relationship between a micro-hardness which is a representation of Vickers hardness of a carbon protective film and methane gas content in an Ar main component sputtering gas. As shown, the micro-hardness increases with increasing methane gas content (in correspondence with hydrogen content increase) and reaches its maximum around methane content of 1 in an arbitrary unit. With further increase of the methane gas content, the micro-hardness decreases. FIG. 12 shows Raman spectra, described in the Related Application, in which FIG. 12 (a) shows a Raman spectrum of a carbon protective film grown in a sputtering gas with zero methane content (hereinafter referred to as "case 1"); FIG. 12 (b) a Raman spectrum of a carbon protective film grown in a sputtering gas with 1 methane content in the arbitrary unit (hereinafter referred to as "case 2"); and FIG. 12 (c) a Raman spectrum of a carbon protective film grown in a sputtering gas with 4 methane content in the arbitrary unit (hereinafter referred to as "case 3"). In the Raman spectrum of FIG. 12 (a) for the case 1, a peak of SP3 level representing diamond bonding shows almost the same height with that of SP2 level representing graphite bonding. The Raman spectrum of FIG. 12 (a) indicates that the graphite-like properties predominate in the carbon protective film which contains a less amount of hydrogen. In the Raman spectrum of FIG. 12 (b) for the case 2, a much higher peak appears at the SP3 level than at the SP2 level. The Raman spectrum of FIG. 12 (b) indicates that diamond bonding predominates over the graphite bonding in the carbon protective film of the case 2, and in correspondence with this the microhardness is large in FIG. 11. FIG. 12 (c) shows the Raman spectrum of a carbon protective film grown in a sputtering gas with a higher methane content, in which a much higher peak appears at the SP3 level than at the SP2 level. The Raman spectrum of FIG. 12 (c) also indicates that the carbon protective film of the case 3 contains high concentration of diamond bonding. We know also from FIG. 12 (c) that the protective film of the case 3 contains many polymer-like bondings, since tails, corresponding to background due to luminescence, are high around each peaks. Accordingly, the hardness of the protective film of the case 3 is estimated to be high because the protective film microscopically contains increased diamond bonds, and toughness of the protective film of the case 3 is estimated to be high due to the increased polymer-like bonds irrespective of decrease in hardness on the micro-scale. And the decrease in the micro-hardness is as large as the micro-hardness of the protective film of the case 3 lowers below that of the case 1 in which the sputtering gas consists only of Ar.

FIG. 13, described in the Related Application, shows a result of a repeated cycle test conducted on a magnetic disc provided with a carbon protective film. The test was conducted with an $Al_2O_3$.TiC thin film magnetic head under a load of 10 gf to examine whether the carbon protective film may endure from 25000 to 30000 repetition cycles of a CSS mode as is usually required. As FIG. 13(a) indicates, the coefficient of friction abruptly increases in the magnetic disc with the graphite-rich carbon protective film of case 1 and the magnetic disc crashes in less than 20000 repetition cycles. As FIG. 13(b) indicates, though the coefficients of friction gradually increase in the magnetic discs with the diamond-rich carbon protective film of case 2, crash occurs in early cycles because of brittleness of the carbon protective film caused by its excessive hardness. The carbon protective film of case 2 shows an around 20000 cycles of CSS resistance even when crash did not occur in an early stage of the cycle test. In contrast to the carbon protective film of the cases 1 and 2, as FIG. 13(c) indicates, the coefficient of friction of the carbon protective film of case 3 increases slowly and the carbon protective film of case 3 endures more than 40000 cycles of CSS operation mode with neither any crash nor any hint of deterioration in the coefficient of friction.

FIG. 14, described in the Related Application, in which FIG. 14(a) shows a Raman spectrum of a carbon protective film. In FIG. 14(a), the spectrum shows a peak of the SP2 level representing graphite bonding around 1350 $cm^{-1}$ of the Raman shift and a peak of the SP3 level representing diamond bonding around 1560 $cm^{-1}$ (1562 $cm^{-1}$). In FIG. 14(a), a region S, defined as an area under an asymptote to both tails of the main SP3 peak, corresponds to a contribution from luminescence part of the Raman spectrum. Accordingly, a luminescence intensity ratio of a carbon protective film defined by B/A, where A is a nominal peak height obtained by subtracting the luminescence part from the total SP3 peak height B that includes the luminescence part. The background (region S) of the Raman spectrum corresponding to the contribution from the luminescence part indicates polymer-like bonds in the carbon protective film. It has been found that carbon on protective film shows an excellent CSS resistance when its B/A ratio is more than 1.5. FIG. 14(b) is a wave chart showing two peaks separated by resolving the SP2 and SP3 contributions through the Gaussian distribution function after subtracting by linear approximation the background (region S) attributed to the luminescence of the Raman spectrum. In the figure, peak intensity ratio D/G is defined as ratio of the intensity D of the SP3 peak to the intensity G of the SP2 peak. It has been found that a hydrogen doped carbon protective film shows an excellent CSS resistance when its D/G ratio falls within a range between 1.3 and 3.5.

At a boundary between a hard head slider and a recording medium, elastic deformation occurs on the recording medium and the slider moves while scratching the recording medium. The aforementioned flexible carbon protective film containing more than 35 atomic % of hydrogen shows an excellent CSS resistance, since brittle fracture hardly occurs in the hydrogen rich carbon protective film because of its large elastic deformation. However the hydrogen rich carbon protective film tends to be worn out to deteriorate its CSS resistance when the hydrogen rich carbon protective film is employed with a slider with high grindability (depending on its material and shape) or when the thickness of the carbon protective film is reduced for facilitating high density data storage. A proposed mechanism that estimates the problem described above will be explained below though the proposed mechanism may not afford well detailed explanation. The hydrogen rich carbon protective film shows high coefficient of friction, since nominal contact area is large because of its high flexibility. It is necessary to increase shearing resistance of the carbon protective film for suppressing the coefficient of friction. It is estimated that the shearing resistance is high when the protective film is thick and that the shearing resistance is low and the coefficient of friction is high when the protective film is thin. Therefore, it is estimated that the CSS resistance is deteriorated in association with thickness reduction of the hydrogen rich carbon protective film.

SUMMARY OF THE INVENTION

In view of the foregoing, an object of the present invention is to provide a magnetic recording medium with high CSS resistance that can be used with hard sliders and facilitates high density data storage by means of reducing thickness of a carbon protective film.

To achieve the object, the magnetic recording medium according to the present invention employs a carbon protective film that further comprises a plurality of carbon layers instead of a single carbon layer. The carbon protective film comprises the first carbon layer having a first hydrogen content; and the second carbon layer having a second hydrogen content which is higher than the first hydrogen content, the second carbon layer being formed on the first carbon layer. Three, four or more carbon layers may be employed, but, according to the present invention, the first hydrogen content is set between 25 atomic % and 35 atomic %, and the second hydrogen content more than 35 atomic %.

When the carbon protective film comprises a plurality of layers each of which has individual hydrogen content, hydrogen content changes discontinuously through each layer boundary as in the case described above. Another magnetic recording medium according to the present invention employs a carbon protective film, the hydrogen content of which increases monotonously from a lower surface to an upper surface of the carbon protective film. The hydrogen content on the lower surface side is set between 25 atomic % and 35 atomic %, and that on the lower surface side is set at more than 35 atomic %.

In fabricating the magnetic recording medium of the present invention described above, a carbon protective film is formed on a magnetic layer, deposited on a non-magnetic base plate, by sputtering from a carbon target under a sputtering gas atmosphere that contains a main component Ar gas to which a methane gas is mixed. In the fabricating method, according to the present invention, for fabricating either the carbon protective film with discontinuously changing hydrogen content or the carbon protective film with continuously changing hydrogen content, the base plate is removed in a sputtering chamber from the side of the first gas feed pipe side to the side of the second gas feed pipe through which the sputtering gas is fed at higher flow rate than through the first gas feed pipe.

In the magnetic recording medium according to the present invention, since the lower carbon layer with low hydrogen content shows high hardness and the upper carbon layer with high hydrogen content shows more flexibility, the lower carbon layer suppresses deformation of the recording medium caused by the pressing down of the slider into the medium to reduce nominal contact area and the upper flexible carbon layer prevents brittle fracture. Therefore, the magnetic recording medium with the structure described above shows a high CSS resistance even when its thickness is reduced. The multi-layer structure has weak points such as peeling-off, but a high CSS resistance is expected to the carbon protective film with continuously changing hydrogen density distribution because this protective film has no layer boundaries in it.

The fabrication method, according to the present invention, facilitates changing protective film thickness and hydrogen content distribution profile in the protective film by only changing flow rate of the same sputtering gas either for fabricating the carbon protective film with multi-layer structure or for that with continuously changing hydrogen density distribution.

DETAILED DESCRIPTION OF PREFERRED EMBODIMENTS

Figure 1:
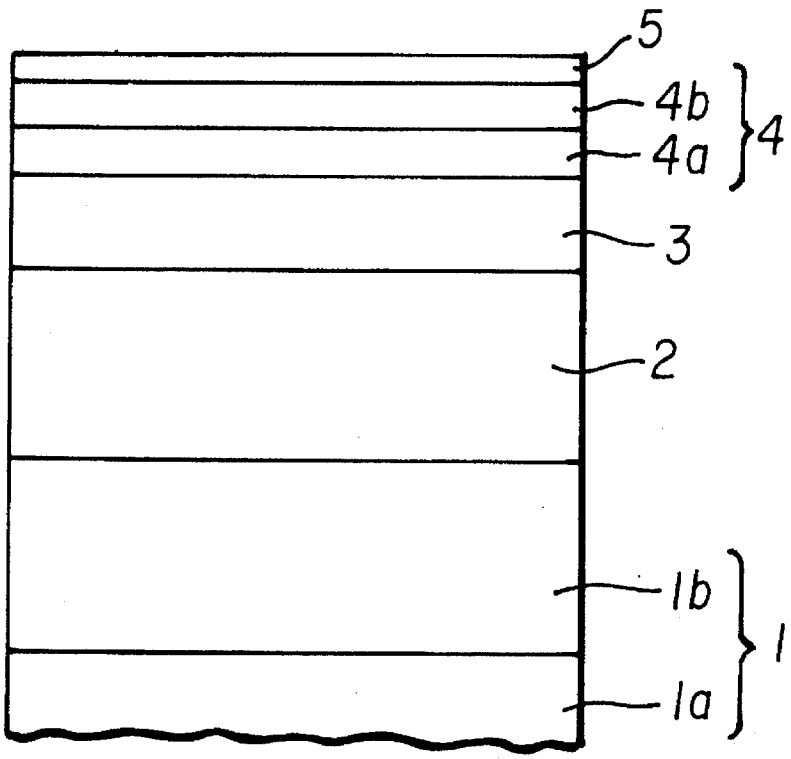
FIG. 1 is a cross sectional view schematically showing a structure of an embodiment of the magnetic recording medium according to the present invention.

FIG. 1 is a cross sectional view schematically showing a structure of an embodiment of the magnetic recording medium according to the present invention.

In FIG. 1, a non-magnetic base plate 1 comprises a non-magnetic metal layer 1b (hardening layer) of 11 μm in thickness formed on a non-magnetic substrate 1a. A non-magnetic metal under layer 2 of 1000 Å in thickness is deposited on the base plate 1. A magnetic layer 3 of 400 Å in thickness made of Co-Cr-Ta (cobalt-chromium-tantalum) ferromagnetic alloy or Co-Cr-Pt (cobalt-chromium-platinum) ferromagnetic alloy is deposited in thin film form on the metal under layer 2. A protective film 4 of 180 Å in thickness is formed on the magnetic layer 3. Then, a lubricative layer 5 of 13 Å in thickness that comprises liquid lubricant is formed, if necessary, on the protective film 4 to complete fabrication of a magnetic recording medium.

As the non-magnetic base plate 1, a base plate, which comprises Ni-P plated layer 1b formed by electroless plating on a non-magnetic Al-Mg alloy substrate 1a, is employed. An alumilite base plate, a glass base plate, a ceramic base plate and the like are also employed. The base plate 1 is polished, if necessary, and is provided with a surface properly roughened by texture formation (texture processed surface). The non-magnetic underlayer 2 that comprises Cr, the magnetic layer 3 made, for example, of Co-Cr-Ta alloy, and an amorphous carbon protective film 4 are successively deposited on the base plate i by the sputtering method under Ar atmosphere on the base plate 1 heated up to 200° C. Fabrication of the metal thin film disc is completed by coating on the protective film 4 the lubricative layer 5 which comprises the liquid lubricant of the fluorocarbon family.

Figure 11:
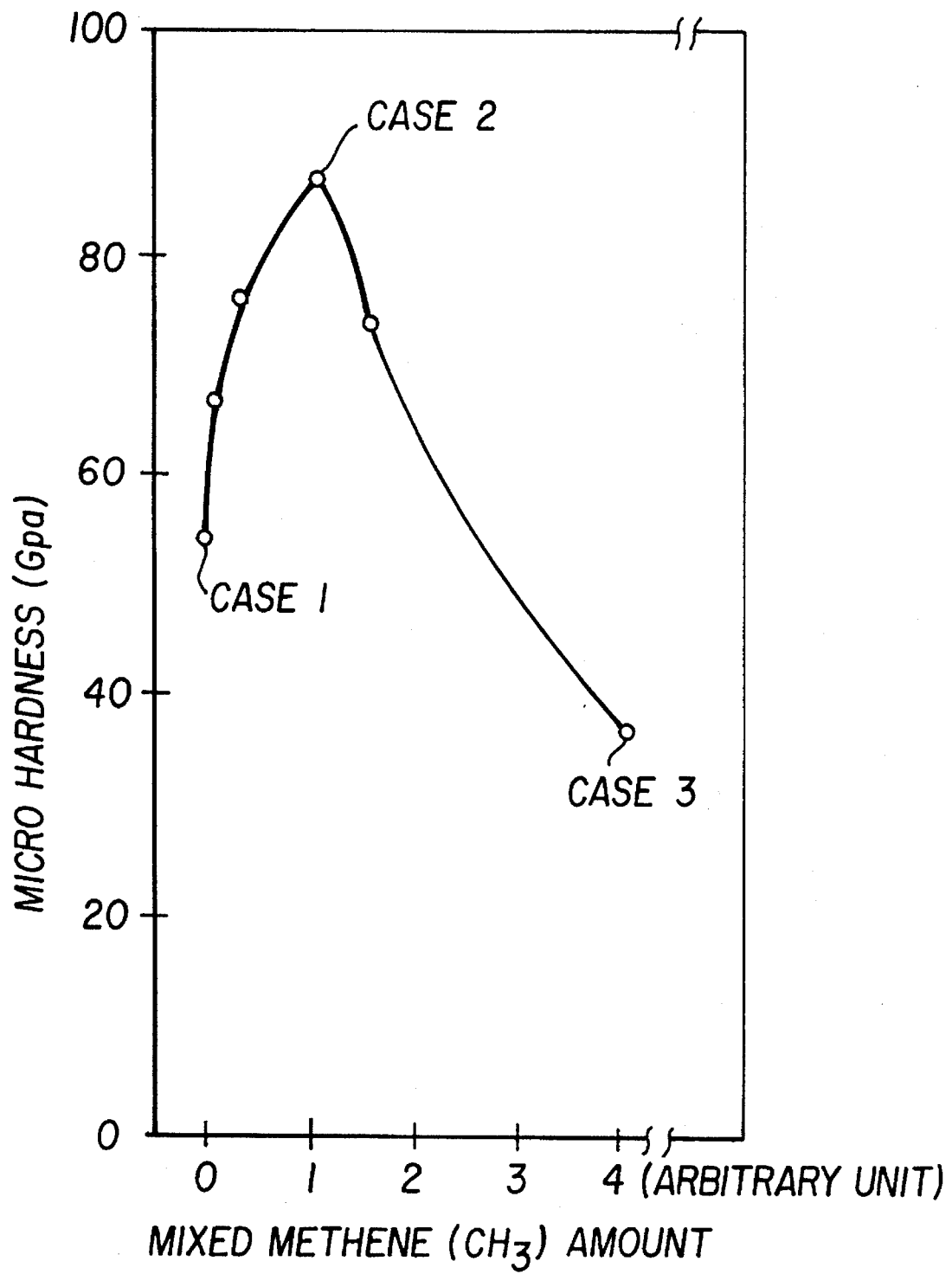
FIG. 11 is a graph showing relationship between the micro-hardness of a carbon protective film and the methane gas contents in the sputtering gas.
Figure 12A:
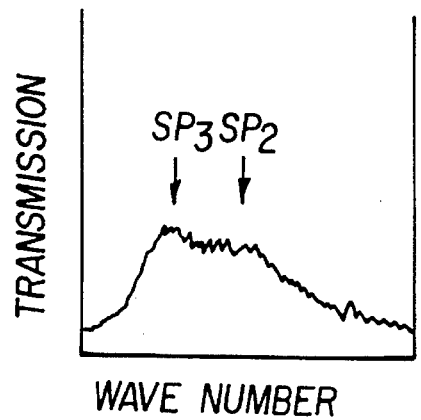
FIGS. 12(a)–(c) show the Raman spectra of the carbon films, 12(a) for the cases 1, 12(b) for the case 2 and 12(c) for the case 3, in which individual methane gas content in the sputtering gas is different.
Figure 12B:
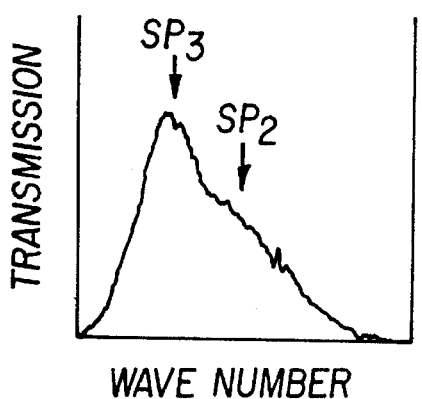
Figure 12C:
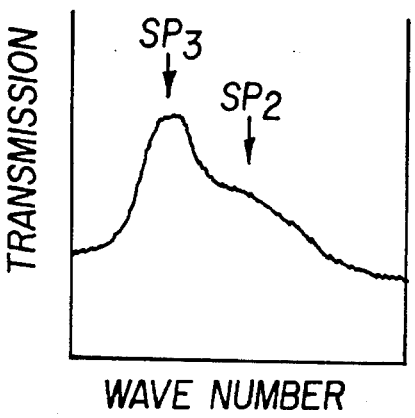
Figure 13A:
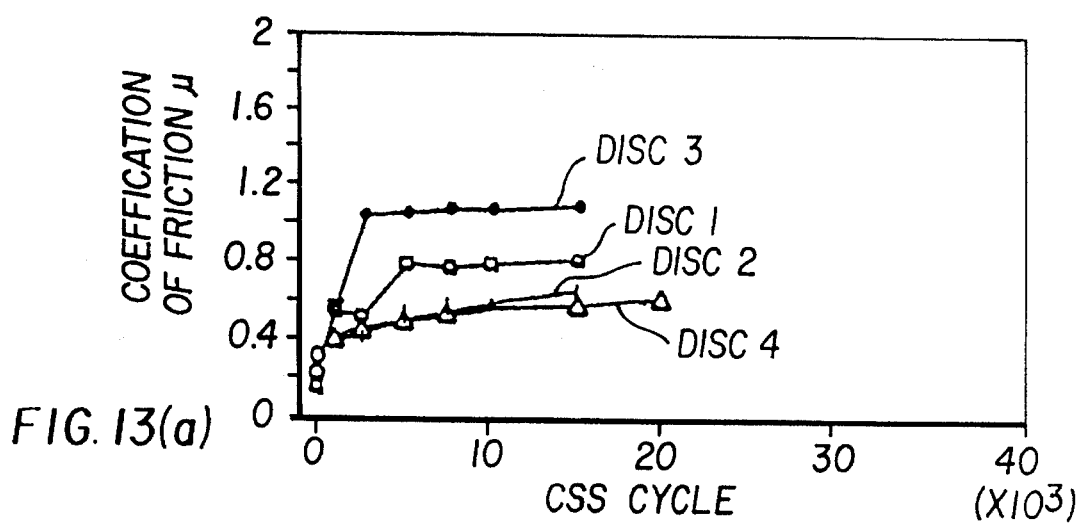
FIG. 13 shows graphs illustrating the variation of coefficient of friction μ of the carbon films of cases 1, 2 and 3 of FIG. 12 with the CSS test cycle.
Figure 13B:
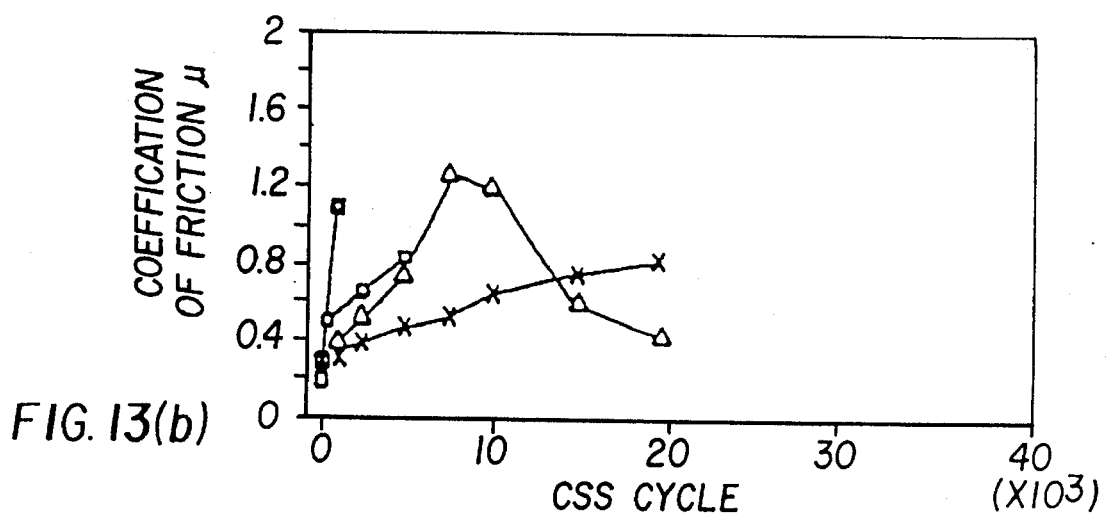
Figure 13C:
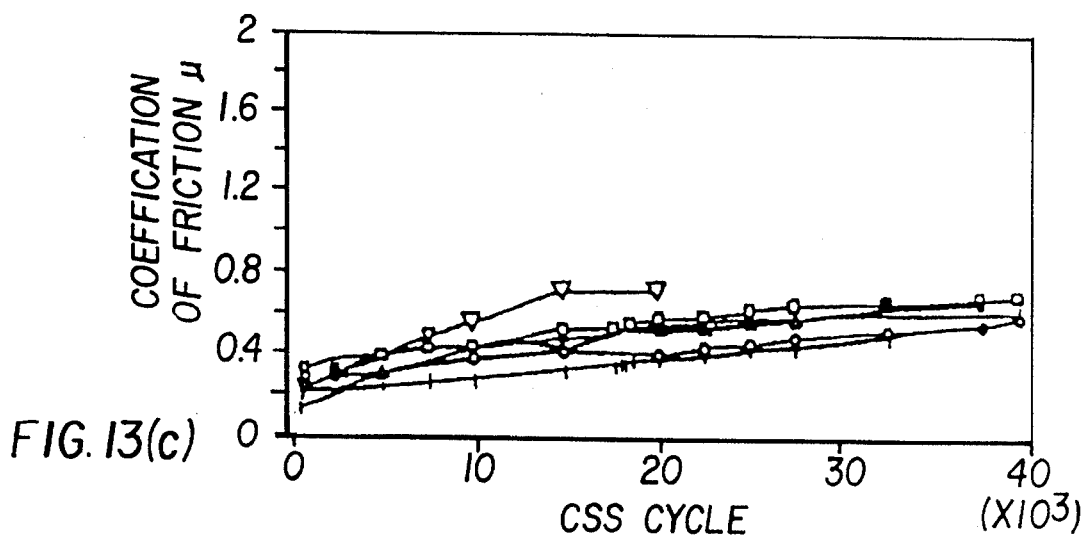
Figure 14A:
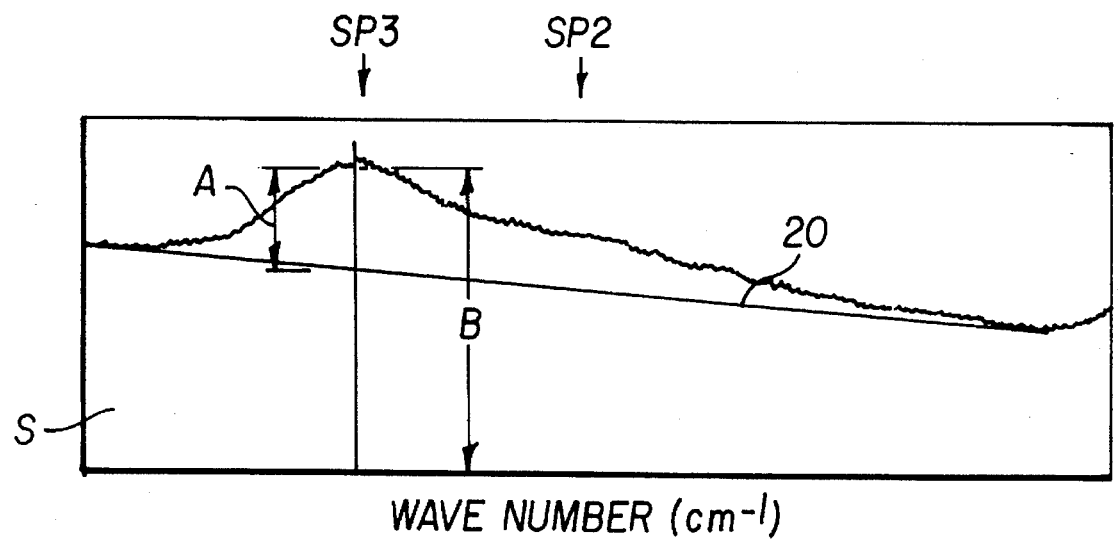
FIG. 14(a) shows a Raman spectrum including luminescence contribution and FIG. 14(b) shows nominal Raman shift obtained by subtracting the luminescence contribution from the Raman spectrum of FIG. 14(a).
Figure 14B:
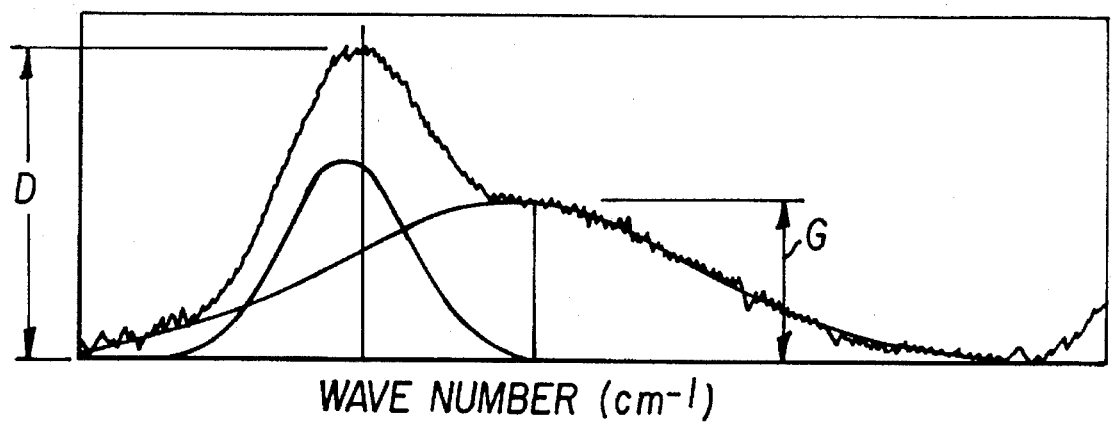

The carbon protective film 4 is formed in thin film form by sputtering from a carbon target under an atmosphere containing a main constituent Ar gas and an additional methane gas. In FIG. 1, the carbon protective film 4 further comprises two carbon layers consisting of the first carbon layer 4a and the second carbon layer 4b deposited on the first carbon layer 4a. The first carbon layer 4a contains around 25% of hydrogen, that corresponds to the case 2 in FIG. 11. The second carbon layer 4b contains around 35% of hydrogen, that corresponds to the case 3 in FIG. 11. Accordingly, the first carbon layer 4a is a hard layer that shows microhardness of more than 60 GPa, and the second carbon layer 4b is a flexible layer that shows micro-hardness of less than 50 GPa. The first carbon layer 4a and the second carbon layer 4b have almost the same thickness of around 90 Å in this embodiment.

Figure 2:
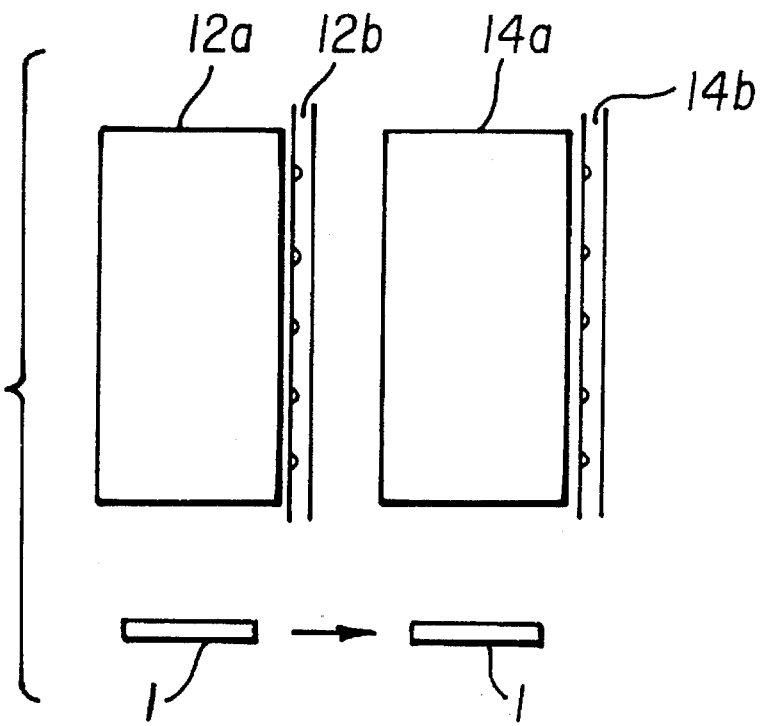
FIG. 2 is a schematic for explaining the method for fabricating the magnetic recording medium according to the present invention.

For fabricating the carbon protective film 4 of double layer structure, a method shown in FIG. 2 is employed. In a sputtering chamber, the first gas feed pipe 12b is positioned in the vicinity of the first carbon target 12a and the second gas feed pipe 14b is positioned in the vicinity of the second carbon target 14a with the pairs of the gas feed pipe and the target separated from each other with predetermined spacing. In fabricating the carbon protective film 4 of double layer structure containing hydrogen, gas flow rate through the second gas feed pipe 14b is set higher than that through the first gas feed pipe 12b, and the base plate 1 is shifted in its position from the side of the first gas feed pipe 12b to the side of the second gas feed pipe 14b. In this embodiment, the same Ar sputtering gas containing 30 mole % of methane is fed through both pipes. Sputtering gas pressure is controlled at 5 mTorr and sputtering power is set at 1370 W. The volumetric sputtering gas flow rate through the first gas feed pipe 12b is controlled at 5 standard cm³/min (hereinafter referred to as SCCM) and that through the second gas feed pipe 14b is controlled at 24 SCCM. The first carbon layer 4a is formed in the vicinity of the target 12a, and the second carbon layer 4b is formed in the vicinity of the target 14a. The carbon protective film, in which hydrogen content increases monotonously from its one surface to another, is formed by slowly and continuously shifting the position of the base plate 1 from the side of the first gas feed pipe 12b to the side of the second gas feed pipe 14b. A sputtering gas based on an Ar gas to which a hydrogen gas is mixed may be used in place of the Ar-methane gas mixture.

Figure 3A:
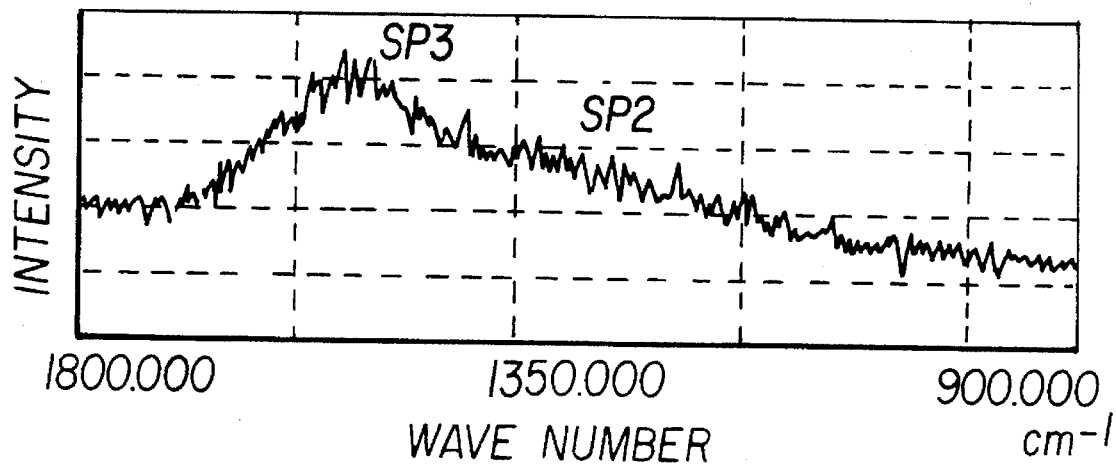
FIG. 3 shows the Raman spectra of the embodiment of the carbon protective film of FIG. 1 according to the present invention.
Figure 3B:
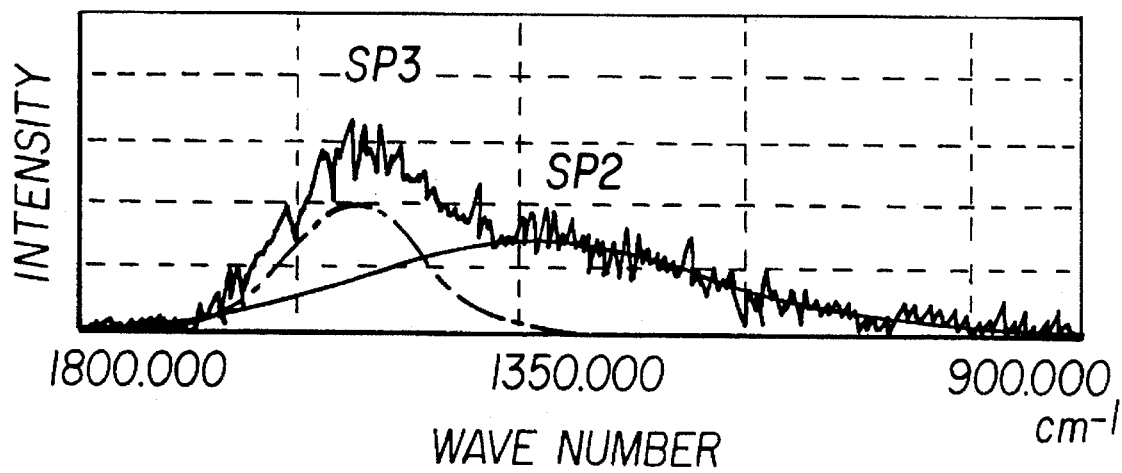
Figure 4A:
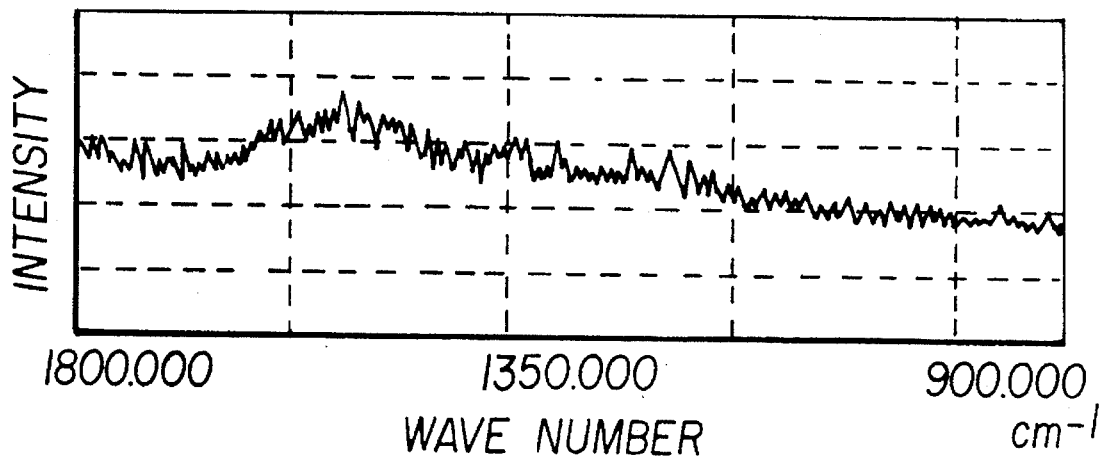
FIG. 4 shows the Raman spectra of the single layer carbon film grown by feeding the sputtering gas at the volumetric flow rate of 24 SCCM.
Figure 4B:
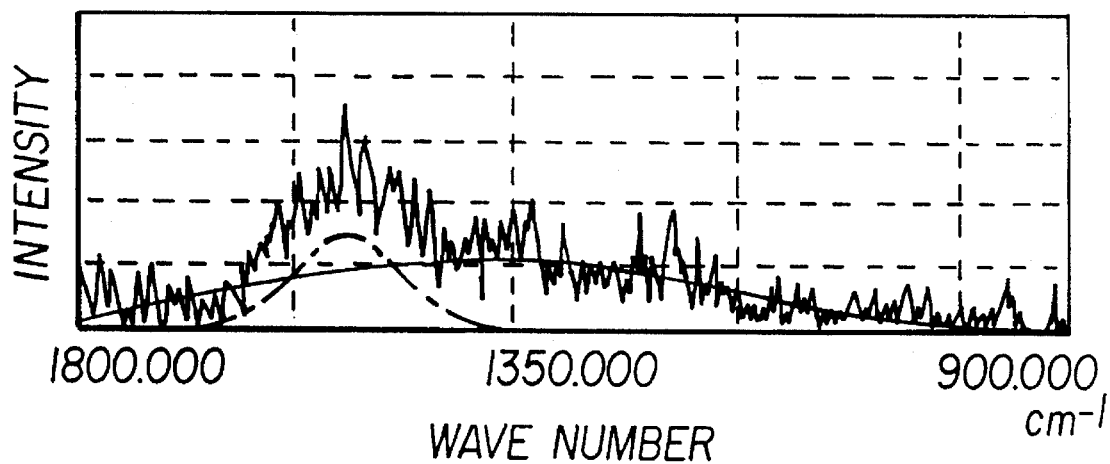
Figure 5A:
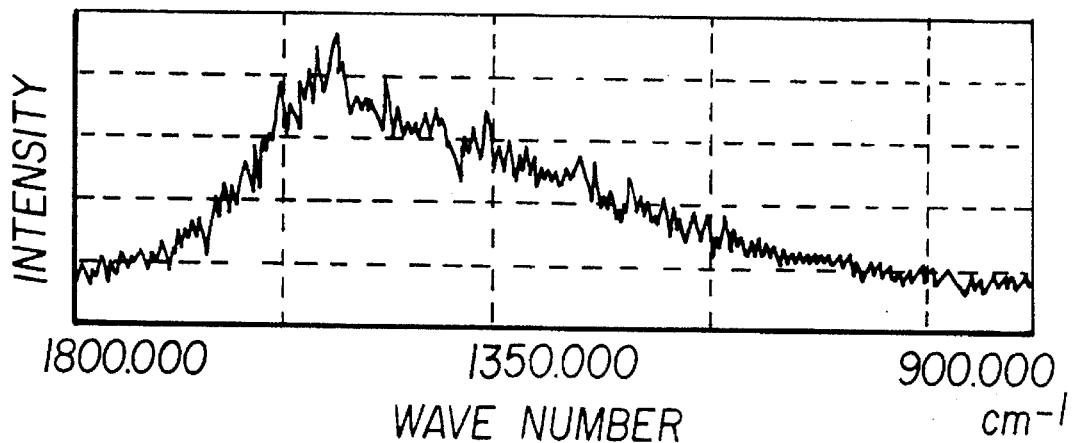
FIG. 5 shows the Raman spectra of the single layer carbon film grown by feeding the sputtering gas at the volumetric flow rate of 5 SCCM.
Figure 5B:
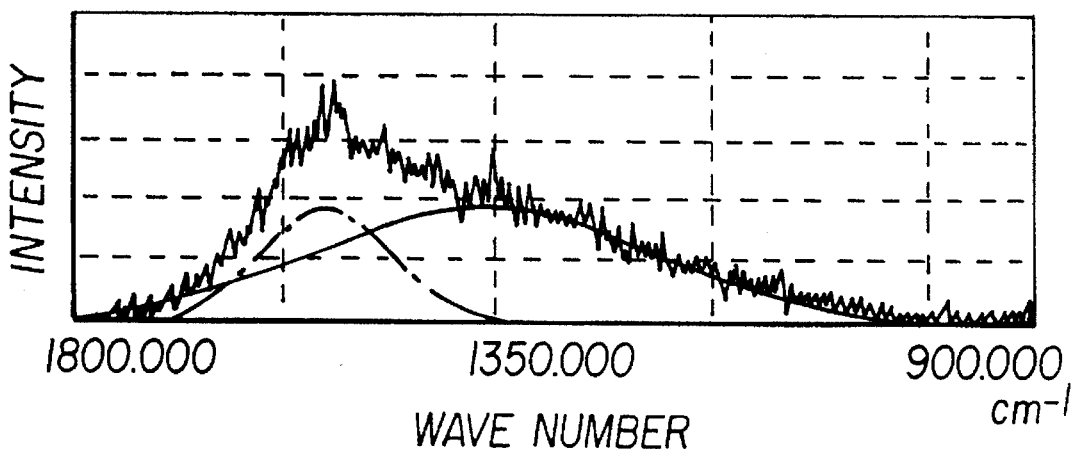

FIG. 3 shows Raman spectra of the carbon film with double layer structure described above. The Raman spectrum shown in FIG. 3(a) shows an SP2 level peak around 1350 cm$^{-1}$ that corresponds to graphite bonding, and an SP3 level peak around 1560 cm$^{-1}$ (1562 cm$^{-1}$) that corresponds to diamond bonding. In FIG. 3(a), tails of both peaks represent luminescence contribution to the Raman spectrum. FIG. 3(b) shows a processed Raman spectrum in which the SP2 and SP3 peaks are resolved by the Gaussian distribution function. An integrated SP3 peak value obtained by integrating the corresponding Gaussian distribution function is 8973 units and an integrated SP2 peak value obtained by integrating the corresponding Gaussian distribution function is 16397 units. FIG. 4 shows Raman spectra of the carbon film with single layer structure grown by feeding the sputtering gas at the volumetric flow rate of 24 SCCM. FIG. 5 shows Raman spectra of the carbon film with single layer structure grown by feeding the sputtering gas at the volumetric flow rate of 5 SCCM. In FIGS. 3, 4 and 5, films are controlled at the same thickness. We know from FIGS. 3, 4 and 5 that the double layer carbon film of FIG. 3 shows intermediate properties between the single layer carbon films of FIGS. 4 and 5.

Figure 6:
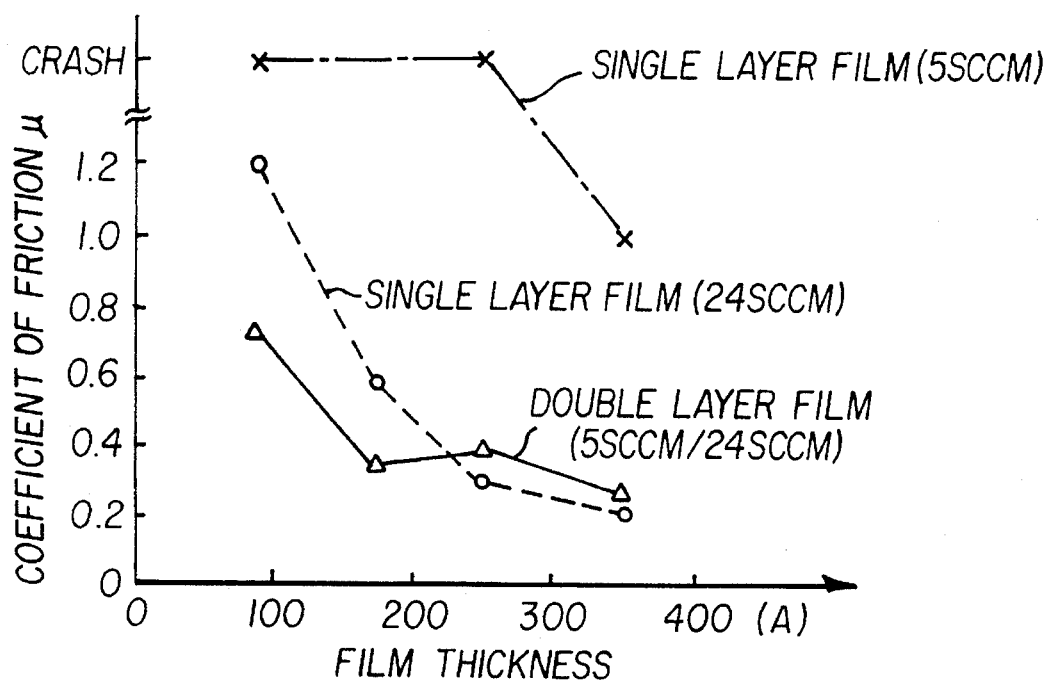
FIG. 6 is a graph showing the variation of coefficient of friction μ with thickness of the single layer and double layer carbon films subjected to the CSS test.

FIG. 6 shows variation of coefficient of friction μ with thickness of carbon films subjected to 20000 cycles of CSS test conducted in association with an $Al_2O_3 \cdot TiC$ slider. As we know from this figure, the highly hydrogen rich carbon film with single layer structure grown in the sputtering gas fed at 24 SCCM shows superior CSS resistance to the intermediate hydrogen rich carbon film with single layer structure grown in the sputtering gas fed at 5 SCCM. However, the coefficients of friction of these single layer films show great increase in the film thickness range of less than 250° C. In contrast to this, the coefficient of friction μ of the double layer carbon film of this embodiment is about 0.8 at the film thickness of 100 Å, and the double layer carbon film, even when its thickness is reduced, still shows an excellent CSS resistance.

Figure 7:
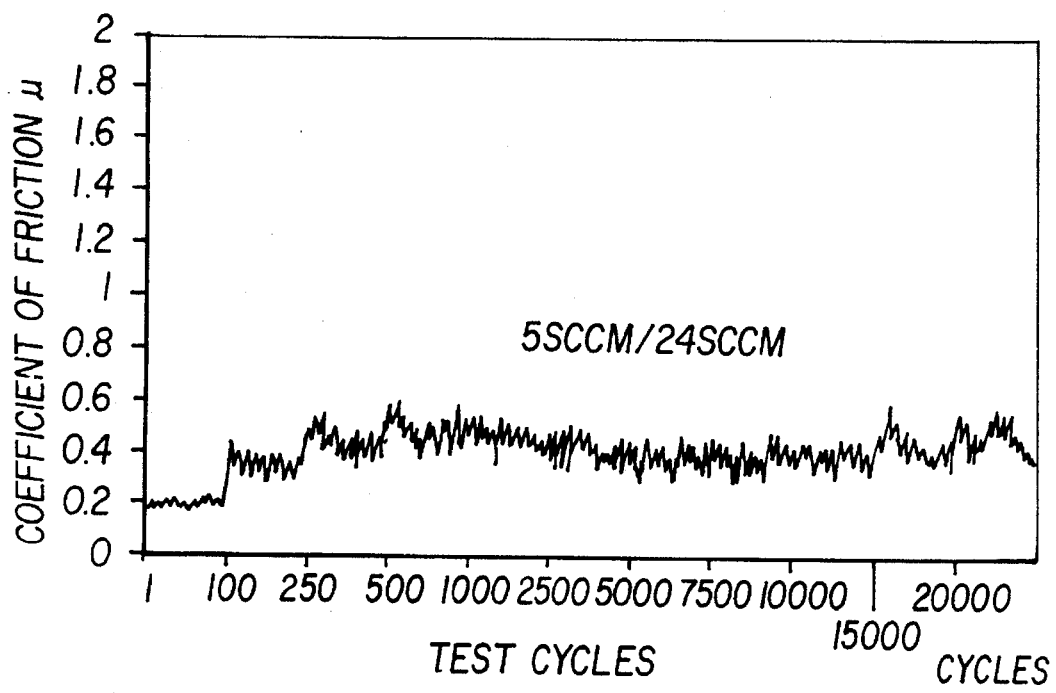
FIG. 7 is a graph showing the variation of coefficient of friction μ of the embodiment of the carbon protective film according to the present invention with the CSS test cycle.
Figure 8:
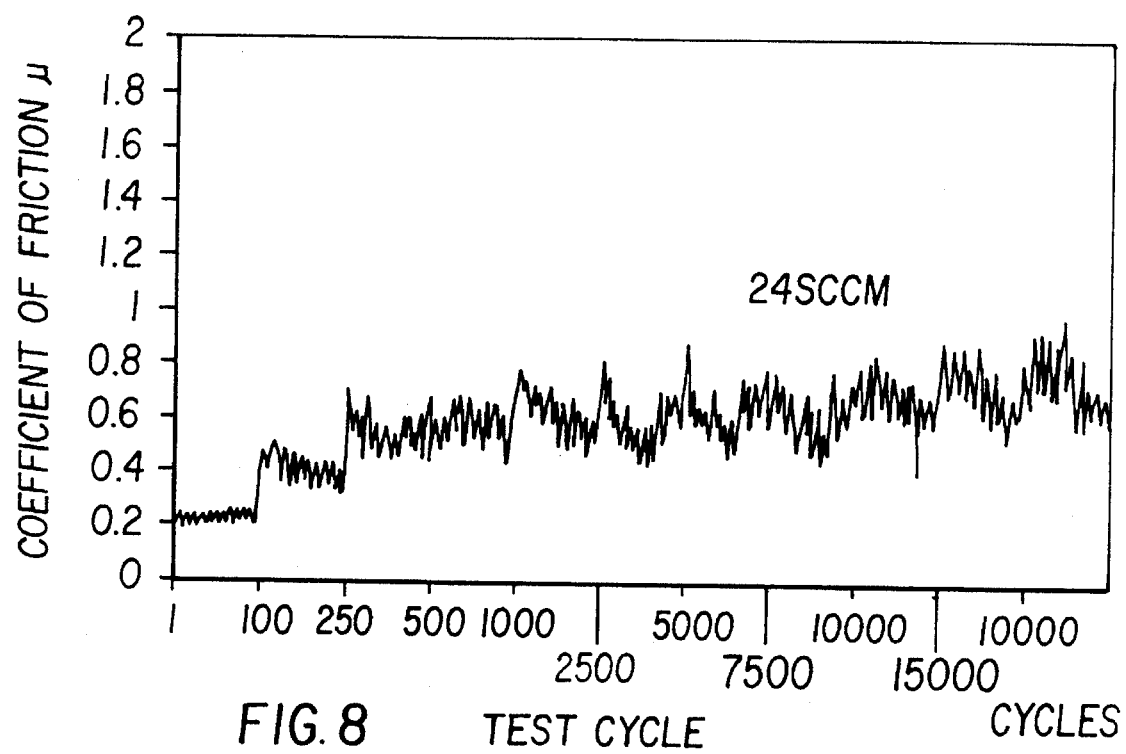
FIG. 8 is a graph showing the variation of coefficient of friction μ of the carbon film grown in the sputtering gas fed at 24 SCCM with the CSS test cycle.
Figure 9:
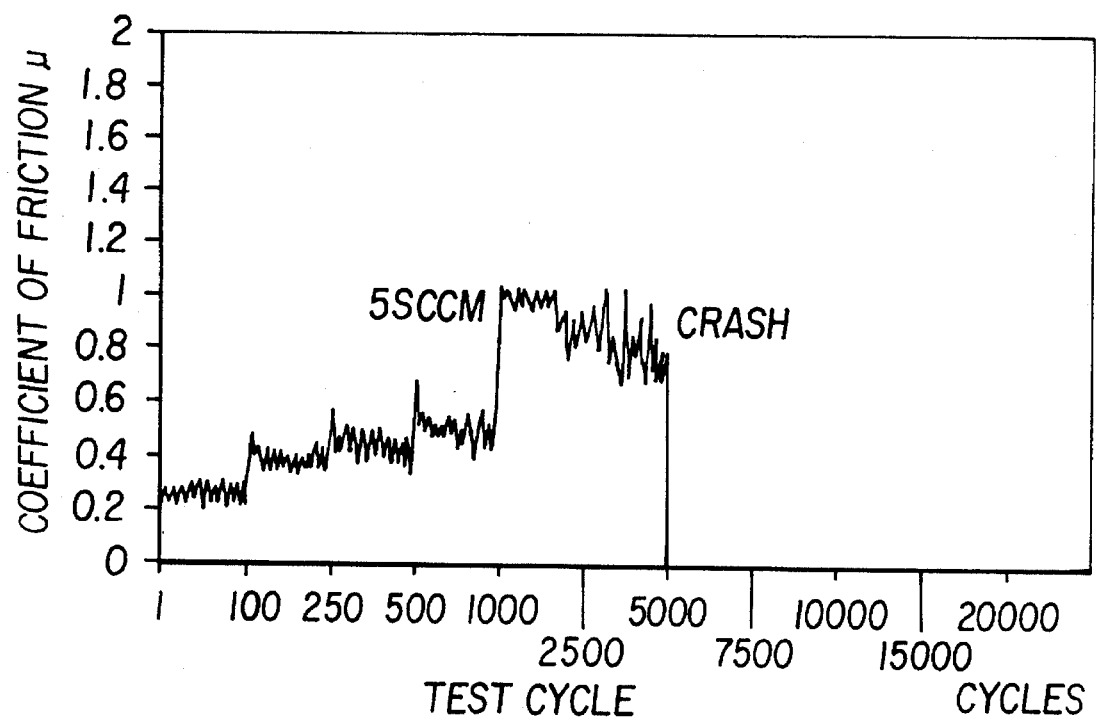
FIG. 9 is a graph showing the variation of coefficient of friction μ of the carbon film grown in the sputtering gas fed at 5 SCCM with the CSS test cycle.
Figure 10:
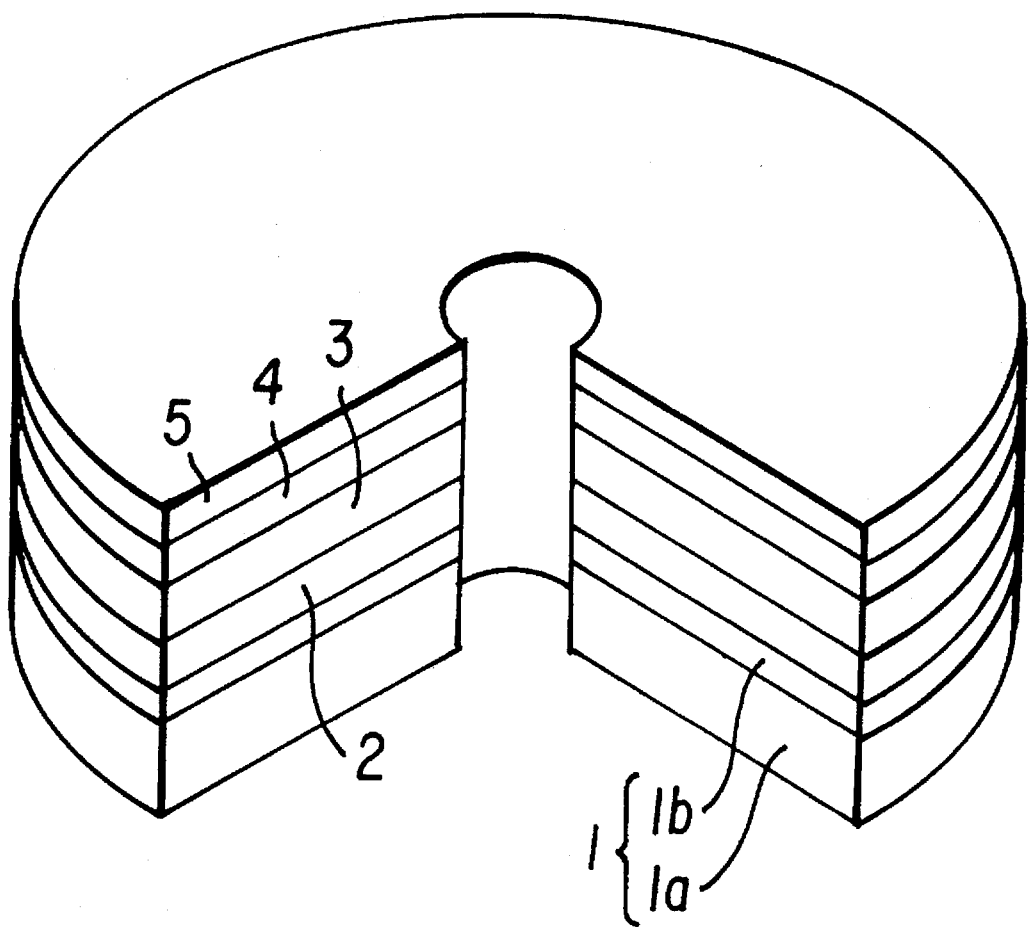
FIG. 10 is a partly sectional perspective view showing a structure of the magnetic disc according to the prior art.

FIG. 7 shows variation of coefficient of friction μ of the double layer carbon film with CSS test cycle when tested with the $Al_2O_3$. TiC slider under the load of 3.5 gf. The coefficient of friction μ of the double layer carbon film does not show any appreciable increase even after 20000 cycles of CSS test and stably remains within a range between 0.2 and 0.6. FIG. 8 shows variation of coefficient of friction μ of the single layer carbon film grown in the sputtering gas fed at 24 SCCM. The coefficient of friction μ of this single layer carbon film increases gradually with increasing test cycles. FIG. 9 shows variation of coefficient of friction μ of the single layer carbon film grown in the sputtering gas fed at 5 SCCM. A crash occurred around 5000 cycles in the test planned to continue up to 20000 test cycles.

As described so far, the hydrogen doped double layer carbon film of the embodiment according to the present invention shows an excellent CSS resistance even when the film thickness is reduced, especially when the film thickness is less than 200 Å.

As has been explained so far, the carbon protective film of the present invention features a double layer structure which comprises a lower carbon layer of low hydrogen content and an upper carbon layer of high hydrogen content, and provides numerous advantages.

Since the lower carbon layer shows high hardness and the upper carbon layer is flexible, the hard lower carbon layer prevents the recording medium from deformation caused by downward pressing of a slider and reduces nominal contact area, and the flexible upper carbon layer eliminates brittle fracture of the protective carbon film. Accordingly, the present carbon protective film shows an excellent CSS resistance high enough to be used with a hard slider even when its thickness is reduced, and facilitates high density data storage with its reduced thickness.

By providing the carbon protective film with hydrogen distribution monotonously increasing from its lower surface to the upper surface and by eliminating any layer boundaries which cause peeling-off in the protective film, the CSS resistance is further improved.

The method for fabricating the magnetic recording medium of the present invention, which employs the same sputtering gas and changes its flow rate corresponding to the designed hydrogen content in the layer, facilitates forming either a carbon protective film with multi-layer structure or a carbon protective film with hydrogen distribution gradient in the desired thickness simply by controlling positioning of the base plate.

What is claimed is:

1. A magnetic recording medium, comprising:

a non-magnetic base plate;

a magnetic layer disposed on said base plate; and a carbon protective film containing hydrogen disposed on said magnetic layer for protecting said magnetic layer, said protective film comprising a plurality of layers, including a first layer having a first hydrogen content formed on said magnetic layer, and a second layer having a second hydrogen content formed on said first layer, wherein said second hydrogen content is higher than said first hydrogen content and a hardness of said second layer is lower than a hardness of said first layer.

2. The magnetic recording medium of claim 1, wherein said first hydrogen content is 25 atomic % to 35 atomic %, and said second hydrogen content is greater than 35 atomic %.

3. A magnetic recording medium, comprising:

a non-magnetic base plate;

a magnetic layer disposed on said base plate; and a carbon protective film containing hydrogen disposed on said magnetic layer for protecting said magnetic layer, said protective film having upper and lower surfaces, wherein a hydrogen content of said protective film increases gradually continuously from said lower surface to said upper surface and a hardness of said carbon protective film decreases from said lower surface to said upper surface.

4. The magnetic recording medium of claim 3, wherein said hydrogen content is 25 atomic % to 35 atomic % at said lower surface, and greater than 35 atomic % at said upper surface.

5. A method for fabricating a magnetic recording medium, comprising the steps of:

forming a non-magnetic base plate;

forming a magnetic layer on said base plate; and forming a carbon protective layer on said magnetic layer by sputtering carbon from a carbon target in a sputtering chamber having first and second gas feed pipes connected thereto which are spaced apart from each other, said sputtering chamber containing a sputtering gas atmosphere which includes Ar gas as a main component and a methane gas as a secondary component, said forming step including (i) moving said base plate in the sputtering chamber from said first gas feed pipe to said second gas feed pipe, and (ii) feeding said sputtering gas at a higher second gas flow rate through said second gas feed pipe than at a first gas flow rate through said first gas feed pipe, wherein a hardness of said carbon protective layer formed at said second gas flow rate is lower than a hardness of said carbon protective layer formed at said first gas flow rate.

* * * * *